Feb. 20, 1973  NAGATAKA SEKI  3,717,807
INVERTER DEVICE
Filed Oct. 15, 1970  2 Sheets-Sheet 1
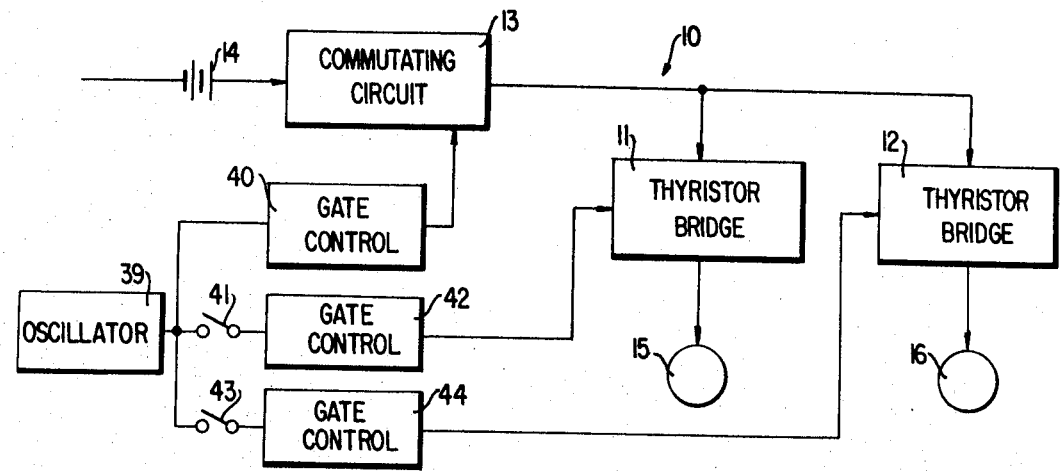
FIG. 1
FIG. 3
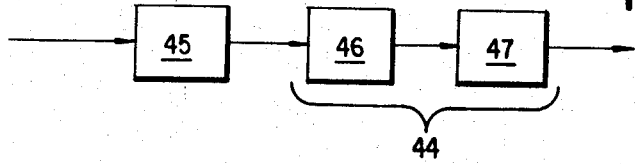

FIG.4g
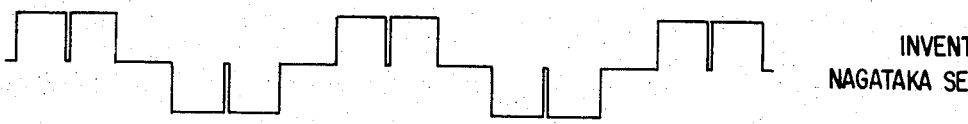 
FIG.4h
INVENTOR
NAGATAKA SEKI
BY Oblon, Fisher & Spivak
ATTORNEYS United States Patent Office 3,717,807
Patented Feb. 20, 1973

3,717,807
INVERTER DEVICE
Nagataka Seki, Tokyo, Japan, assignor to Tokyo Shibaura Electric Co., Ltd., Kawasaki-shi, Japan
Filed Oct. 15, 1970, Ser. No. 81,049
Claims priority, application Japan, Oct. 15, 1969, 44/82,034
Int. Cl. H02m 7/48
U.S. Cl. 321—27 R                                     5 Claims

ABSTRACT OF THE DISCLOSURE

An inverter device includes a plurality of thyristor bridges respectively connected to a corresponding load for enabling the separate energization thereof. An essentially single commutating circuit device is provided in common with all of the bridges for enabling thyristors therein to be simultaneously turned on and off. A common frequency source is provided for supplying synchronized gating pulses to the common commutating circuit as well as to the thyristor bridges. The thyristor bridges respectively receive the gating pulses from the frequency source through separate gate controls. In this manner, it is possible to selectively energize a plurality of loads from an essentially single inverter device.

BACKGROUND OF THE INVENTION

Field of the invention

The present invention generally relates to an inverter device, and more particularly to an inverter device which is capable of selectively energizing a plurality of loads without the need for mechanical switches.

Description of the prior art

In the past, a plurality of mechanical switches was generally employed for selectively connecting electric loads, such as electric motors, to the output of an inverter device. While somewhat satisfactory, one of the problems found to exist with the use of mechanical switches was that they generally included separated contacts which were often damaged by an electric arc of high temperature when the same occurred therebetween. Moreover, it was found that such mechanical devices were relatively large in size, expensive, and that it was difficult to maintain the contacts thereof. One manner of eliminating the above problems was to provide a plurality of inverter devices, each of which was separately connected to a corresponding motor set. While again somewhat satisfactory, such an arrangement became even larger in size, more complicated, and more expensive.

SUMMARY OF THE INVENTION

Accordingly, it is one object of this invention to provide a new and improved unique inverter device which is capable of selectively energizing a plurality of motor sets therefrom.

Another object of this invention is to provide a new and improved unique inverter device in which a plurality of thyristor bridges is employed for separately energizing a corresponding motor set and an essentially single commutating circuit device is provided for the bridges and in common therewith.

Still another object of the invention is to provide a new and improved unique inverter device which includes a plurality of thyristor bridges, each of which functions as a static switch for a corresponding motor set.

One other object of this invention is to provide a new and improved unique inverter device which is relatively small in size, easy to maintain and inexpensive.

Briefly, in accordance with this invention, these and other objects are, in one aspect, attained by the provision of a plurality of thyristor bridges, each having an output which is separately connected to a corresponding electric load. All of the thyristor bridges are connected in common to a single commutating circuit device and are energized from a D.C. voltage supply through a thyristor unit located within the common commutating circuit device. Gate control circuits are provided for separately controlling the thyristor bridges for enabling the electric loads connected thereto to be separately energized. The common commutating circuit is also provided with a gate control circuit. All of the gate control circuits are connected to a common frequency source for enabling the synchronized gate control signals to be received therefrom.

BRIEF DESCRIPTION OF THE DRAWINGS

The present invention will be more fully understood from the following description when taken in connection with the accompanying drawings, wherein:

FIG. 1 is a block diagram of a preferred embodiment of an inverter device according to the present invention;

FIG. 3 is a block diagram of a gate control circuit including a frequency divider, a ring counter and a pulse generator.

DETAILED DESCRIPTION OF THE PREFERRED EMBODIMENTS

Figure 4A:
FIG. 4 shows typical waveforms for illustrating one mode of operation of an inverter device according to the present invention.

Referring now to the drawings, wherein like reference numerals designate identical or corresponding parts throughout the several views, and more particularly to FIG. 1 thereof, wherein an inverter device is generally shown with a reference numeral 10, and the same includes a pair of thyristor bridges 11 and 12 and an essentially single commutating circuit 13 which is common to all the thyristor bridges. Each of the thyristor bridges 11 and 12 are excited from a D.C. voltage supply 14 through the commutating circuit 13. The thyristor bridges 11 and 12 will then respectively supply an A.C. voltage to an electrical load, such, for example, as induction motors 15 and 16.

Figure 2:
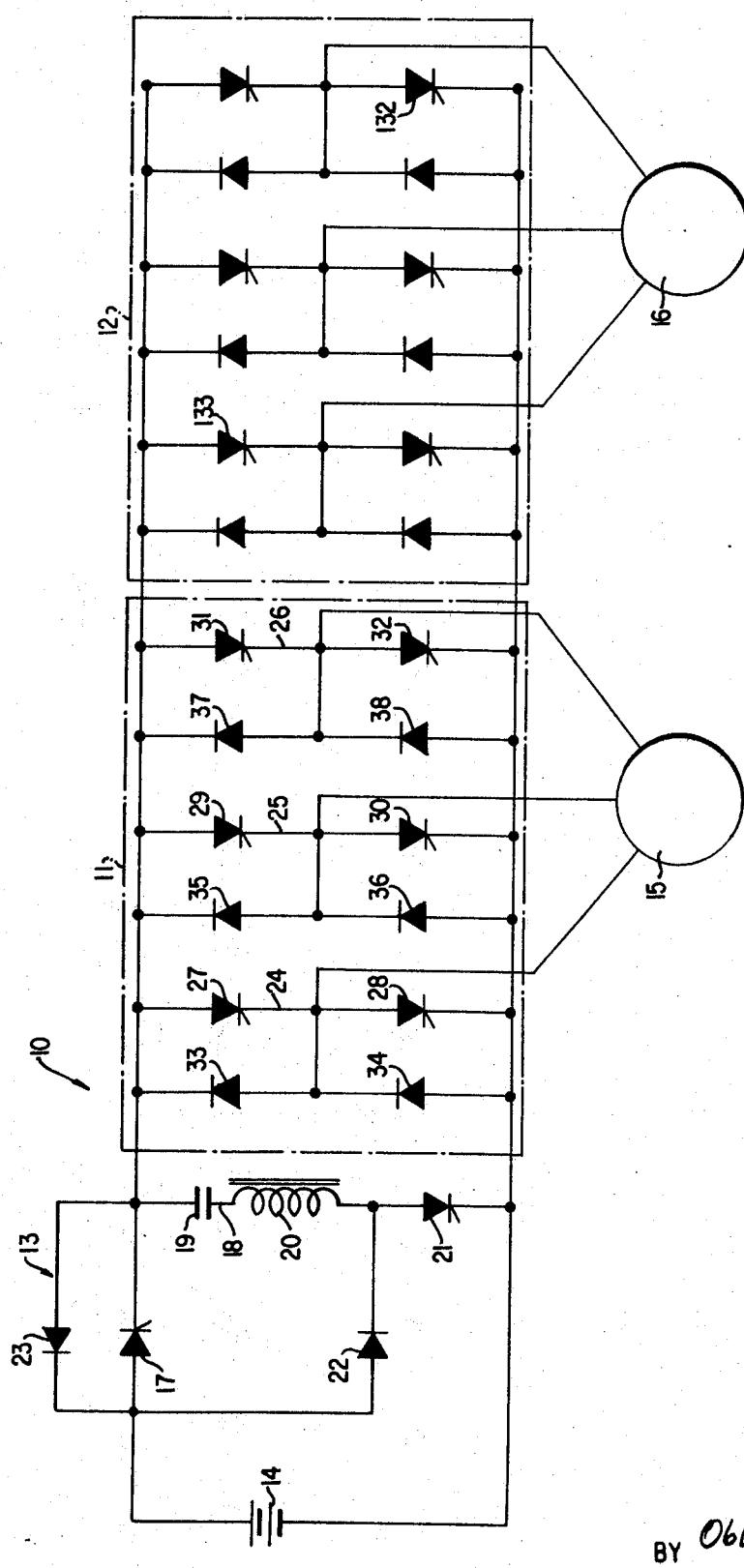
FIG. 2 shows a circuit diagram of an inverter device in accordance with the present invention.

Referring now to FIG. 2, a detailed circuit diagram of the inverter 10 is therein shown. The commutating circuit 13 is shown as including a main thyristor unit 17 which is serially connected between the D.C. voltage supply 14 and the thyristor bridges 11 and 12 and the same serves to periodically close and open the main circuit to the thyristor bridges. Accordingly, it should be easily understood that both of the thyristor bridges 11 and 12 will simultaneously be turned off during the turn-off state of the thyristor 17 of the commutating circuit 13, and will simultaneously have the potential of the voltage supply 14 applied across them, although they will not necessarily be turned on, during the turn-on state of the thyristor 17.

Additionally, a circuit 18, which serially includes a commutating capacitor 19, a commutating reactor 20, and an auxiliary thyristor 21, is provided and connected across the input of both of the thyristor bridges 11 and 12 for controlling the turning on and off of the thyristor 17. As shown, another auxiliary thyristor 22 is provided and connected between the anode of the main thyristor 17 and an intermediate connecting point of the reactor 20 and the thyristor 21. Also, a diode 23 is connected in parallel with the main thyristor 17 in a polarity opposite thereto.

It should be understood that the capacitor 19 of the circuit 18 will be charged from the D.C. voltage supply 14 and the auxiliary thyristor 21 will be turned on during the turn-on of main thyristor 17 until the voltage level of the capacitor 19 reaches an amplitude equal to that of D.C. voltage supply 14 at which time the auxiliary thyristor 21 will be naturally turned off.

In order to turn off the main thyristor 17 after having been turned on, it is necessary to turn on the auxiliary thyristor 22 and then discharge the capacitor 19 through the main thyristor 17, the auxiliary thyristor 22 and the commutating reactor 20. Under such conditions, it should be apparent that the discharging current from the capacitor 19 will pass through the main thyristor 17 in the reverse direction thereto. Now, when the amplitude of the backward current flowing through the main thyristor 17 becomes equal to that of the forward current flowing therethrough, the current flowing through the same will become zero, and the discharging current of the capacitor 19 which will then have an amplitude which exceeds the forward current of the main thyristor 17 can be passed through the parallel diode 23 and the auxiliary thyristor 22. Thus, the main thyristor 17 will be negatively biased by the forward voltage drop of the diode 23 until the same is completely turned off.

The auxiliary thyristor 22 will be naturally turned off when the capacitor 19 has been discharged. It should also be understood that the commutating reactor 20 will further function to prolong the discharge time of the capacitor 19, such that the forward voltage drop of the diode 23, which acts as the negative bias voltage for the main thyristor 17, will be provided for a time interval sufficient to cause the main thyristor 17 to turn off.

The thyristor bridges 11 and 12 may be, for example, of a three-phase bridge type, and are connected in a parallel relationship between the cathode of the main thyristor 17 of the commutating circuit 13 and the negative terminal of the D.C. voltage supply 14. The thyristor bridge 11 includes three arms 24, 25 and 26 which are connected in parallel with each other, and each of the arms respectively includes a pair of serially connected thyristors 27, 28, 29, 30, 31, and 32. Additionally, as shown, respective and conventional feed-back diodes 33, 34, 35, 36, 37, and 38 are connected in parallel with each of the aforesaid thyristors. The intermediate connecting points of each of the arms 24, 25 and 26 are connected to the motor 15 for energization of the same. As is well known, the thyristors 27 to 32 are sequentially turned on with an electrical angle of 60° according to the order of 27, 32, 29, 28, 31 and 30.

When a gating signal or pulse is applied to the gate of a selected one of the thyristors 27 to 32 and at the same time a gating signal or pulse is applied to the main thyristor 17 of the commutating circuit 13 to cause it to turn on, the motor 15 will be excited with an A.C. voltage from the bridge 11. When it is intended to provide commutation from a given arm to the other, a gating pulse or signal will be applied to the gate of the thyristor 22 of the commutating circuit 13 to turn off the main thyristor 17 thereof, whereby the thyristors turned on in the bridge 11 will be turned off. Proper gating signals or pulses will then be applied to the gates of thyristors 17 and 21 to cause them to again turn on, and at the same time, the gating signals or pulses will be applied to the gates of other predetermined thyristors in the bridge 11. Thus, the motor 15 will again be excited by another phase of the thyristor bridge 11. The conduction of the thyristor 21 will cause the capacitor 19 to charge again for provision of the next commutation.

It should be understood that the thyristor bridge 12 is the same in its construction as the aforesaid thyristor bridge 11. However, the bridges 11 and 12 are triggered by separate gate control circuits, as is described hereinbelow, and therefore may be separately controlled and caused to operate at different frequencies. That is, although both bridges are commutated at the same frequency, the gating pulses, which actually fire the thyristors in the two bridges, may be delivered at different frequencies, causing the two bridges to operate separately under the control of the different frequency gating signals.

Referring again to FIG. 1, it is seen that a frequency source, such as an oscillator 39, is provided for generating the desired gating signals or pulses. The output signals of the oscillator 39 are applied to the commutating circuit 13 through a gate control circuit 40. The output of the oscillator 39 is also applied to the bridge 11 through a switch 41 and a gate control circuit 42. Similarly, the output of the oscillator 39 is applied to the thyristor bridge 12 through a switch 43 and a gate control circuit 44. With such an arrangement, it is possible to obtain synchronization among the commutating circuit 13 and the thyristor bridge 11, as well as the thyristor bridge 12.

From the aforesaid description, it can be understood that the motors 15 and 16 can be selectively excited by an essentially single inverter device 10. Thus, for example, if the switch 41 is in an open position, no gating pulses will be delivered for triggering the thyristors 27–32, and thus the thyristor bridge 11 will not generate an A.C. output voltage therefrom and accordingly, the motor 15 will be deenergized for the stopping thereof. On the other hand, gating pulses will be delivered to the thyristors in the bridge 12, and thus the bridge 12 will generate an A.C. output voltage therefrom to excite the motor 16 despite the stopping of the motor 15.

Now, when operation of the motor 15 is desired, this can be easily obtained by closing the switch 41 such that the output signals or pulses from the oscillator 39 will be applied to the thyristor bridge 11 through the switch 41 and the gate control circuit 42.

It should be understood that in accordance with the present invention that if the motors 15 and 16 are of the induction type that it is possible to run the motors 15 and 16 with different rotational speeds by regulating the phase angle between the gating signals which are applied to both of the thyristor bridges 11 and 12.

It should further be understood that with the present invention it is also possible to simultaneously generate different output frequencies with the use of the essentially single inverter device 10. Thus, by way of example, the bridge 11 can generate an output signal of 60 Hz. and the bridge 12 can simultaneously generate an output signal of 30 Hz. In the disclosed embodiment since the bridges 11 and 12 have been designated as being of the three-phase type, it is therefore necessary to generate six pulses in order to operate the bridge during each cycle of operation thereof. In accomplishing this, the output frequency of the oscillator 39 should be selected to be 360 Hz., which corresponds to the product of the aforesaid six pulses and 60 Hz. which is the least common multiple of the desired output frequencies 60 Hz. and 30 Hz.

In accordance with the above, the output frequency of the oscillator 39 is directly applied to the commutation circuit 13 through the gate control circuit 40. On the other hand, the gating signals from the oscillator 39 before being applied to the bridge 12 should be divided in half by a frequency divider 45, as shown in FIG. 3, to provide a signal of 180 Hz. The output signal from the divider 45 is then applied to a ring counter 46 which is located within the gate control 44 for being distributed into the necessary six arrays. As such, six pulses having a phase difference of 60° is provided for one cycle of operation of the bridge 12. These pulses are applied to the gates of the bridge 12 through a conventional pulse generating unit 47 located within the gate control 44. It should be apparent that the gating signals to be applied to the bridge 11 are applied directly to the ring counter 46 without going through the frequency divider 45.

In accordance with the above, where both of the motor 15 and 16 have the same poles, the motor 15, which is excited by the bridge 11, can be rotated at a given speed, while the motor 16, which is excited by the bridge 12, can be rotated at a speed which is half that of the given speed. Moreover, when one of the motors 15 or 16 has a half pole to the other, then both of the motors can be operated at the same speeds.

Figure 4B:
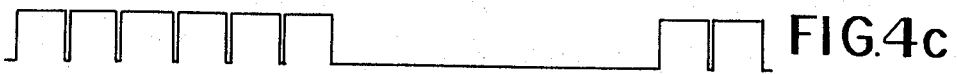
Figure 4C:
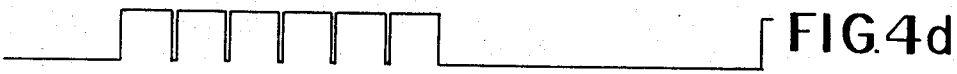
Figure 4D:
Figure 4E:
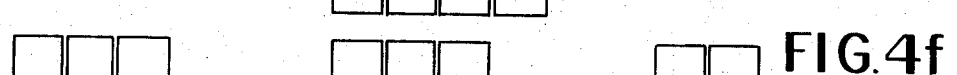
Figure 4F:
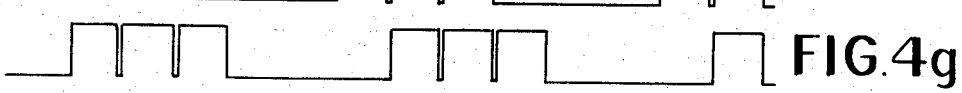

FIGS. 4a through 4h show typical waveforms at various locations among the inverter device 10. Thus, FIG. 4a shows a typical output for the oscillator 39. FIG. 4b shows the output of the commutating circuit 13. FIG. 4c shows the current flowing through the thyristor 27 of the bridge 11. FIG. 4d shows the current flowing through the thyristor 32, and FIG. 4e shows the output of the bridge 11. FIG. 4f shows the current flowing through the thyristor 133 of the bridge 12. FIG. 4g shows the current flowing through the thyristor 132 of the bridge 12, and FIG. 4h represents the output of the bridge 12.

Obviously numerous modifications and variations of the present invention are possible in view of the above teachings. Thus, for example, while the present invention has been described as utilizing two bridges, any number of bridges could be used. Likewise, the direction of operation of the motors excited from the bridges could be readily reversed. It is therefore to be understood that within the scope of the appended claims, the invention may be practiced otherwise than as specifically described herein.

What is claimed as new and desired to be secured by Letters Patent of the United States is:

1. An inverter device comprising:
   a D.C. voltage supply;
   a plurality of thyristor bridges, each of which has a pair of D.C. input terminals and which are connected in parallel relationship at said D.C. inputs, each of said bridges having an output which is selectively connected to a corresponding load;
   a single commutating circuit device located between said D.C. voltage supply and the D.C. inputs of said thyristor bridges; and
   means connected to said commutating circuit device and selectively connected to said thyristor bridges for supplying synchronized gating signals thereto, whereby gating pulses to one or more of said plurality of thyristor bridges may be stopped thereby stopping the operation of one or more of said thyristor bridges even though all of said thyristor bridges are commutated by said single commutating circuit device.

2. An inverter device according to claim 1, wherein said commutating circuit device includes a main thyristor unit for periodically closing and opening the application of said D.C. voltage supply to said thyristor bridges.

3. An inverter device according to claim 1, wherein said means connected to said commutating circuit device and selectively connected to said thyristor bridges includes.
   an oscillator, and
   a plurality of gate control circuit devices, each of which has the input thereof connected to said oscillator and the output thereof separately connected to a respective one of said thyristor bridges.

4. An inverter device according to claim 3, wherein at least one of said gate control circuit devices is provided with a frequency divider for enabling at least one of said thyristor bridges to be operated with a frequency less than that of others of said thyristor bridges.

5. An inverter device according to claim 3, wherein said gate control circuit devices are provided with means for selectively operating said thyristor bridges.

References Cited

UNITED STATES PATENTS

| 3,321,697 | 5/1967 | Etter | 321—45 C |
| 3,439,242 | 4/1969 | Gasser | 321—27 R |
| 3,538,419 | 11/1970 | Nagataka Seki et al. | 321—45 C |
| 3,538,405 | 11/1970 | Borden et al. | 321—27 X |
| 3,309,600 | 3/1967 | Wellford | 321—5 X |

WILLIAM M. SHOOP, Jr., Primary Examiner

U.S. Cl. X.R.

321—45 C